(12) United States Patent
Wang et al.

(10) Patent No.: US 9,603,311 B2
(45) Date of Patent: Mar. 28, 2017

(54) RECIPROCATING POWER TOOL (71) Applicant: Techtronic Outdoor Products Technology Limited, Hamilton (BM)

(72) Inventors: Yulong Wang, Dongguan (CN); Lv Chen, Dongguan (CN)

(73) Assignee: TECHTRONIC OUTDOOR PRODUCTS TECHNOLOGY LIMITED, Hamilton (BM)

( * ) Notice: Subject to any disclaimer, the term of this patent is extended or adjusted under 35 U.S.C. 154(b) by 231 days.

(21) Appl. No.: 14/255,012

(22) Filed: Apr. 17, 2014

(65) Prior Publication Data
US 2015/0150194 A1 Jun. 4, 2015

(30) Foreign Application Priority Data
Nov. 29, 2013 (CN) .................. 2013 2 0776120 U (51) Int. Cl.
*A01G 3/053* (2006.01)

(52) U.S. Cl.
CPC ................. *A01G 3/053* (2013.01)

(58) Field of Classification Search
CPC ...................................... A01G 3/053
See application file for complete search history.

(56) References Cited

U.S. PATENT DOCUMENTS

| 3,536,976 | A | * | 10/1970 | Weidauer | A01G 3/053 30/228 |
| 3,583,067 | A | * | 6/1971 | Briskman et al. | B25F 3/00 192/33 R |
| 3,897,630 | A | * | 8/1975 | Glover | A01G 3/053 30/220 |
| 3,909,943 | A | * | 10/1975 | Buschman | B27B 1/00 30/216 |
| 4,932,126 | A | * | 6/1990 | Pilatowicz | A01G 3/053 30/216 |
| 5,531,027 | A | * | 7/1996 | Martinez | A01G 3/053 30/216 |
| 5,689,887 | A | * | 11/1997 | Heywood | B23D 49/006 30/216 |
| 6,236,177 | B1 | * | 5/2001 | Zick | B23D 59/001 318/362 |
| 6,598,299 | B2 | * | 7/2003 | Stark | A01G 3/053 30/216 |
| 7,788,811 | B2 | * | 9/2010 | Hanada | A01G 3/053 30/210 |

(Continued)

FOREIGN PATENT DOCUMENTS

| CN | 201830692 U | 5/2011 |
| DE | 102011086081 B3 | 2/2013 |

(Continued)

*Primary Examiner* — Hwei C Payer
(74) *Attorney, Agent, or Firm* — Michael Best & Friedrich LLP (57) ABSTRACT

A reciprocating power tool includes a reciprocating cutting mechanism arranged to be driven by a motor via a driving assembly. The driving assembly includes a resilient arrangement arranged to be charged when the cutting mechanism is driven by the motor. When the drive from the motor is terminated, the resilient arrangement is arranged to reverse the cutting mechanism from the direction of the drive from the motor.

21 Claims, 6 Drawing Sheets

(56) References Cited

U.S. PATENT DOCUMENTS

| | | | | |
|---|---|---|---|---|
| 8,955,227 B2* | 2/2015 | Lee | ................ | B67B 7/385 30/416 |
| 2009/0188361 A1* | 7/2009 | Simpson | ................ | A01G 3/053 83/367 |
| 2010/0064527 A1* | 3/2010 | Lee | ................ | A01G 3/037 30/228 |
| 2010/0205811 A1* | 8/2010 | Heinzelmann | ......... | A01G 3/053 30/223 |
| 2011/0179651 A1* | 7/2011 | Hittmann | ............... | A01G 3/053 30/216 |
| 2015/0150194 A1* | 6/2015 | Wang | ................ | A01G 3/053 30/216 |

FOREIGN PATENT DOCUMENTS

| | | | |
|---|---|---|---|
| EP | 2027768 B1 | 4/2010 | |
| EP | 2338325 A1 | 6/2011 | |
| EP | 2027767 B1 | 11/2011 | |
| EP | 1969919 B1 | 1/2012 | |
| EP | 2248413 B1 | 2/2012 | |
| EP | 2198690 B1 | 9/2013 | |
| EP | 2 878 191 A1 * | 6/2015 | |
| FR | 2939008 B1 | 6/2011 | |
| GB | 2352609 A | 2/2001 | |
| WO | 2013023696 A1 | 2/2013 | |
| WO | 2013122522 A1 | 8/2013 | |

* cited by examiner

RECIPROCATING POWER TOOL

CROSS-REFERENCE TO RELATED APPLICATIONS

This application claims priority to Chinese Utility Model Application No. 201320776120.1, filed Nov. 29, 2013, which is incorporated herein by reference in its entirety.

BACKGROUND OF THE INVENTION

The present invention relates to a reciprocating power tool, and more particularly, although not exclusively, to a reciprocating power tool having an anti-jamming mechanism.

Reciprocating power tools such as hedge trimmers are often used in gardening. Hedge trimmers can generally be divided into two categories, manual type and motorized type. Whilst some gardeners may still rely on the manual type trimmer, motorized trimmers are gaining momentum in the market in replacing manual trimmers as motorized trimmers can trim faster and with much less effort for any given hedge trimming job.

Whilst motorized trimmers can offer a number of distinctive advantages over manual trimmers, they are not free of problems. One common problem encountered by users of motorized trimmer is the jamming of the blades during gardening works. Specifically, if a tree branch or other hedges is brought into the region between the cutting blades of a hedge trimmer during use, the branch may cause the trimmer to jam. Significant effort is required to un-jam the hedge trimmer and hence the efficiency of gardening works will suffer as a result of the jamming.

SUMMARY OF THE INVENTION

It is an object of the present invention to overcome or substantially ameliorate the above disadvantages or more generally to provide an improved reciprocating power tool such as but not limited to a hedge trimmer.

According to one aspect of the invention, a reciprocating power tool includes a reciprocating cutting mechanism arranged to be driven by a motor via a driving assembly. The driving assembly includes a resilient arrangement arranged to be charged when the cutting mechanism is driven by the motor. When the drive from the motor is terminated, the resilient arrangement is arranged to reverse the cutting mechanism from a direction of the drive from the motor.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 2:
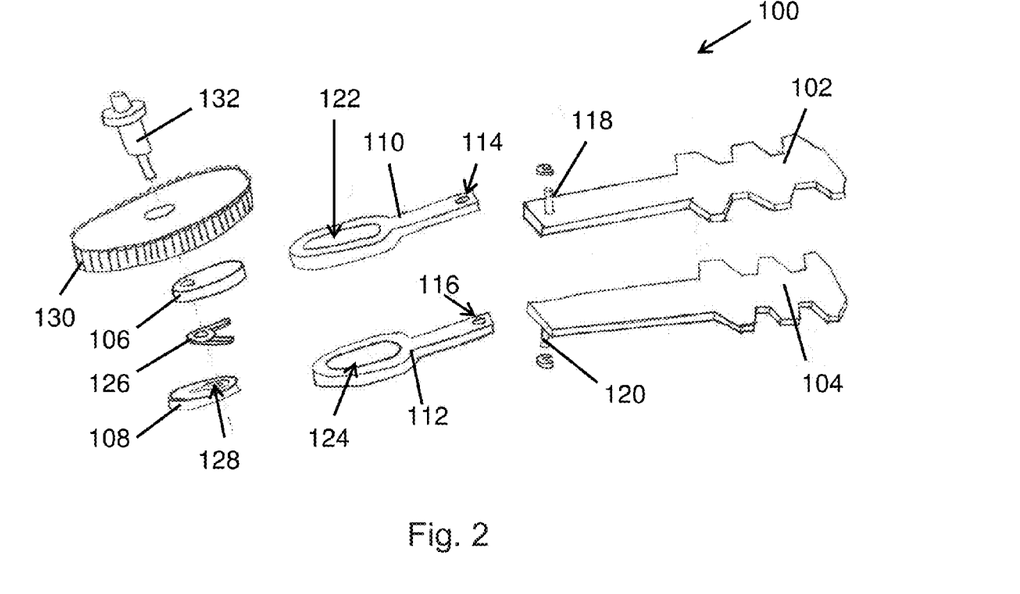
FIG. 2 is an exploded view of a driving mechanism of the reciprocating power tool of FIG. 1.

Referring now to FIG. 2, there is shown a reciprocating power tool comprising: a reciprocating cutting mechanism arranged to be driven by a motor via a transmission cam assembly, wherein the transmission cam assembly includes a resilient arrangement arranged to be charged when the cutting mechanism is driven by the motor and, whereupon the drive from the motor is terminated, the resilient arrangement is arranged to reverse the cutting mechanism from a direction of the drive from the motor.

Figure 1:
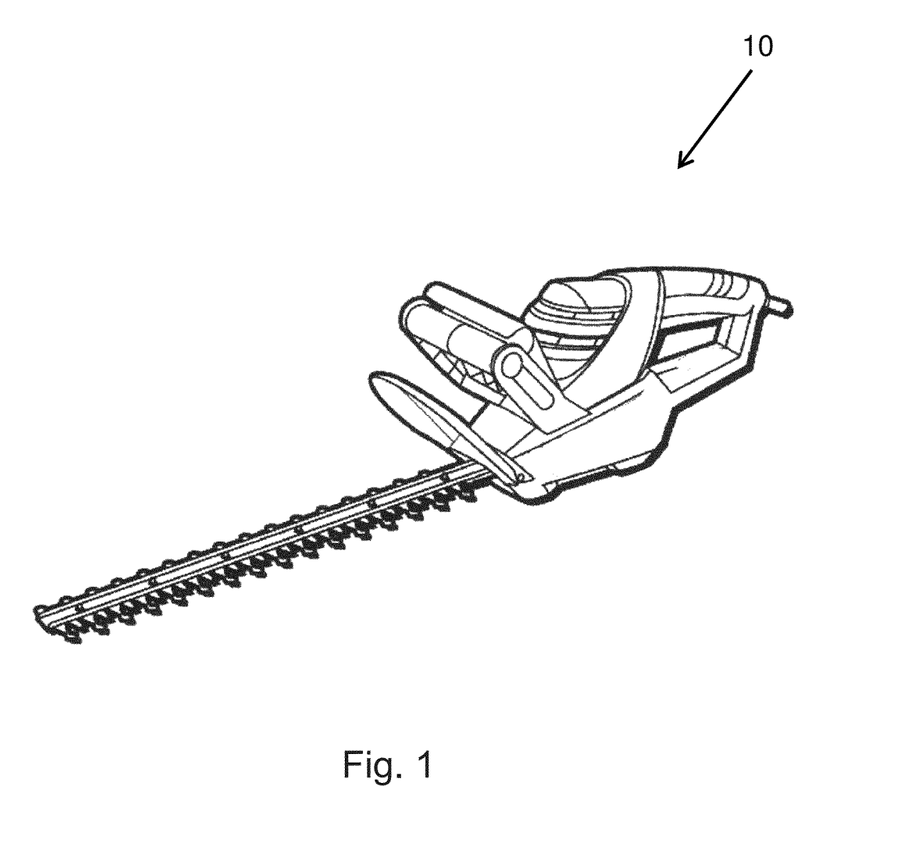
FIG. 1 shows a reciprocating power tool in one embodiment of the present invention.

In the illustrated invention, the reciprocating power tool 10 can be, but not limited to, a hedge trimmer as shown in FIG. 1. FIG. 2 shows an exploded view of a driving mechanism 100 of the reciprocating power tool in an embodiment of the invention. As shown in FIG. 2, the reciprocating power tool comprises a pair of blades 102, 104 connected to a transmission cam assembly having two cams 106, 108 through the connectors 110, 112. In one embodiment, the connectors 110, 112 are specifically arranged with openings 114, 116 to connect with a post 118, 120 formed at an end of each of the blades 102, 104 and with a larger cavity 122, 124 for housing the cams 106, 108 therein. In other embodiments, other forms of connection can also be used to couple the blades with the cams.

In an embodiment as illustrated in FIG. 2, the cams 106, 108 are eccentric and are not in alignment with each other. Advantageously, the out of alignment arrangement of the cams 106, 108 allow the blades 102, 104 to reciprocate out of phase with respect to each other for cutting or trimming. With continuous reference to FIGS. 2 and 3, there is shown a torsion spring 126 disposed between the cams 106, 108. In a preferred embodiment, the torsion spring 126 is disposed in the grooves 128 (only one is shown in FIG. 2) formed on the cams 106, 108 such that the spring 126 is substantially enclosed by the cams. In some embodiments, other torsional resilient elements may be used instead of a torsion spring.

Figure 3:
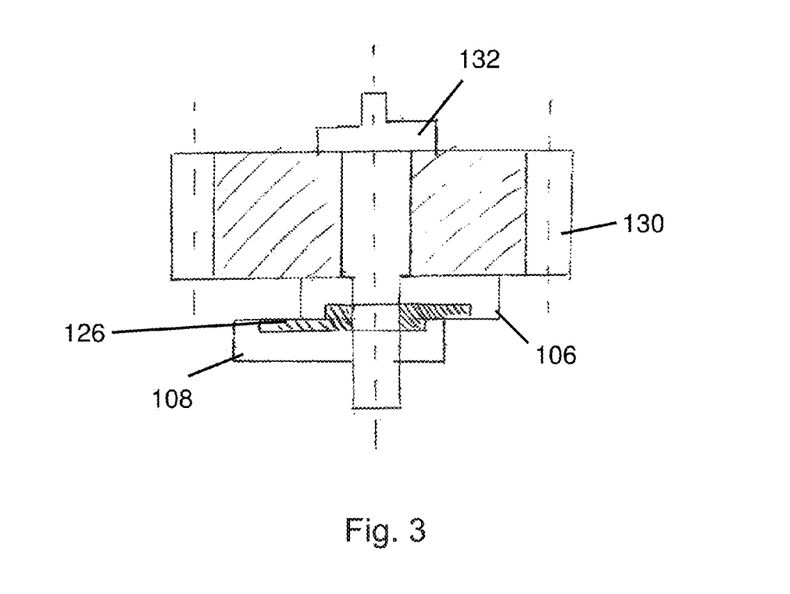
FIG. 3 is a cross sectional view showing the cam arrangement of the driving mechanism of FIG. 2.

The torsion spring 126 acts as an anti-jamming mechanism that un-jams the blades 102, 104 when the blades are jammed by an obstacle caught within the blades and in turn preventing the blades from moving further. Specifically, when the blades 102, 104 are operating normally, the torsion spring 126 is firstly compressed/loaded/charged by the driving force delivered from the motor via the cams 106, 108. Once the torsion spring 126 is charged, the motor will continue to drive the blades 102, 104 so as to perform the cutting function. When the blades 102, 104 are jammed by the cutting object (e.g., a tree branch or any obstacle which prevents the blades from moving further), the driving force from the motor will be terminated and thus the torsion spring 126 will be released/unloaded/discharged, that is the spring will exert a recoil torque on the cams 106, 108 so as to un-jam the blades 102, 104 by reversing the direction of reciprocation of the blades. The detailed operation of the transmission mechanism will be further described below. In one embodiment, a transmission cam assembly may be formed by a combination of any of the cams 106, 108, the torsion spring 126 and the connectors 110, 112.

As shown in FIG. 2, the reciprocating power tool further comprises a gear member 130 and a motor shaft 132. Specifically, the motor shaft 132 is arranged to extend through the gear 130, the cams 106, 108, and the torsion spring 126 for transmitting rotation and hence driving the blades 102, 104. Preferably, the reciprocating power tool further comprises an actuator (not shown) for actuating the motor and thus actuating the cutting function of the blades 102, 104. The actuator may be disposed on the housing of the tool such that it can be easily accessed by a user to control the on/off of the tool.

In one embodiment, the reciprocating power tool further comprises a detection circuit (not shown) arranged to detect the jamming of the blades. In some embodiments, the detection circuit is an optical sensor arranged to detect movement of the blades 102, 104 such that if the blades are not moving whilst electric current is supplied to drive the motor, a jam is registered. Alternatively, in another embodiment, the detection circuit is arranged to monitor the current or voltage or other electrical parameters associated with the motor so as to detect the occurrence of jamming. For example when the blades are jammed, the cams and hence the motor shaft will also be stuck. As a result, a large current or voltage will be developed across the motor. The detection circuit, when detecting an abnormal change in current or voltage associated with the motor, or any other indicators of a jam, would automatically cut off power supply to the motor so as to terminate the motor from driving the blades 102, 104. Once this occurs, the driving force delivered to the blades 102, 104 is stopped and the torsion spring 126 is allowed to discharge so as to reverse the blades 102, 104 from the jam on an obstacle that is preventing the blades from cutting. The above process is shown in the flow chart as shown in FIG. 4.

In this way, a user who is pressing the actuator to operate the power tool and subsequently experiences a jam would see that the motor is terminated and the blades 102, 104 reversed from the jam. In the invention, the power to the motor remains cut off until the user re-actuates the actuator to reactivate the power tool with a new cycle of operation and thus despite the user continuously depressing the actuator, the motor will not operate until the user releases the actuator and re-actuates the actuator to start a new operating cycle.

It should be noted that although other elements of the reciprocating tool, such as the motor, the handle, the actuator, the control circuit, the housing, and other accessories are not specifically shown in the drawings, a skilled person would readily appreciate that these elements are and can be readily included in the reciprocating power tool.

Figure 4:
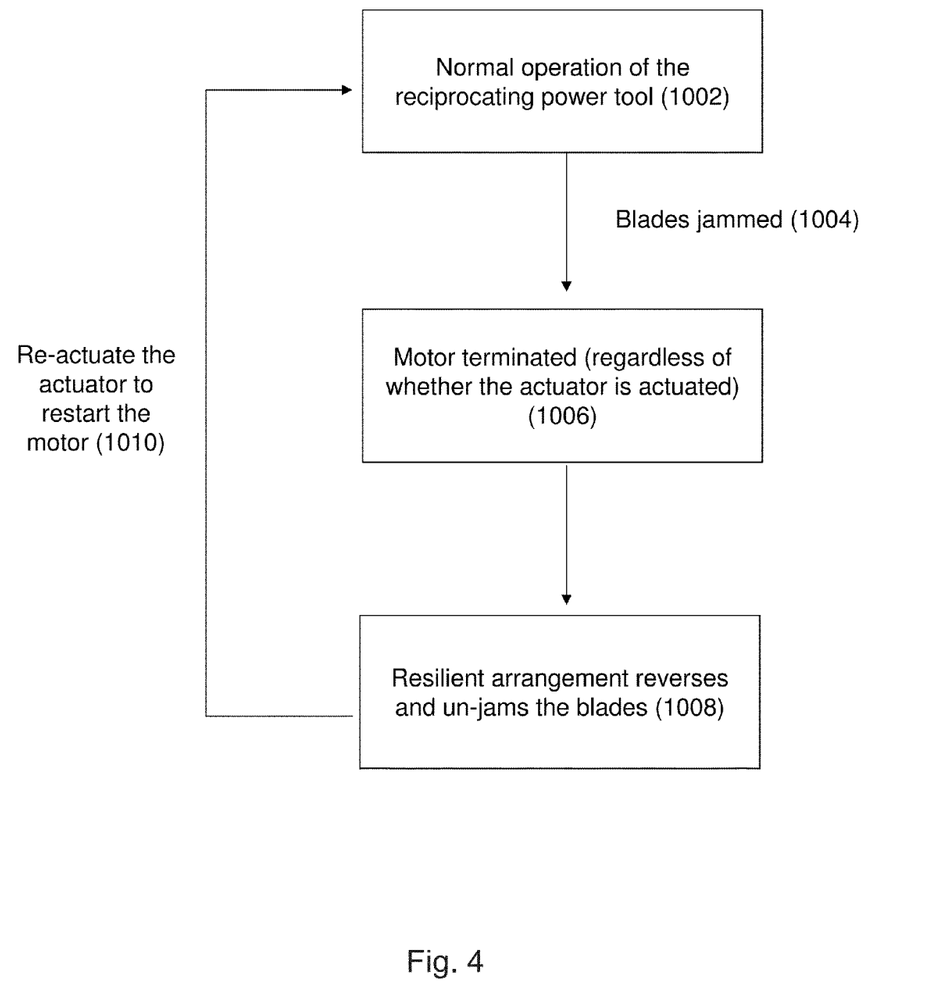
FIG. 4 shows a flow chart illustrating the operation of the reciprocating power tool in FIG. 1.

With reference to FIG. 4, in operation, the user first actuates an actuator (not shown) on a housing of the tool. Upon actuating the actuator the motor is driven into rotation and the rotation of the motor is transmitted to the transmission cams 106, 108 through the gear 130 and the motor shaft 132. The cams 106, 108, being eccentric and aligned out of phase with each other, then drive the blades 102, 104 into reciprocating motion for trimming or cutting. During normal operation in step 1002, the torque exerted on the spring 126 by the motor is generally larger than the recoil torque provided by the torsion spring 126 itself. Accordingly, the torsion spring 126 will be compressed and spring energy is stored.

When the blades 102, 104 are stuck or jammed by an obstacle in step 1004, the detection circuit of the tool will detect such jamming and subsequently terminates the motor's operation in step 1006. From this moment on, the power to the motor remains cut off irrespective of whether the actuator is actuated by the user. As a result, the torque generated by the motor is removed, and the torsion spring 126 can release the spring energy stored by exerting a recoiling torque on the cam members 106, 108. Accordingly, the blades 102, 104 will reciprocate in a reverse direction so as to un-jam the blades in step 1008. Once the blades 102, 104 are un-jammed, the user will then have to re-actuate the actuator in order to set the blades into a new cycle of motion for operating the tool once again in step 1010 as the sensor or detection circuit will terminate the operation of the motor unit the next operation cycle.

Figure 5:
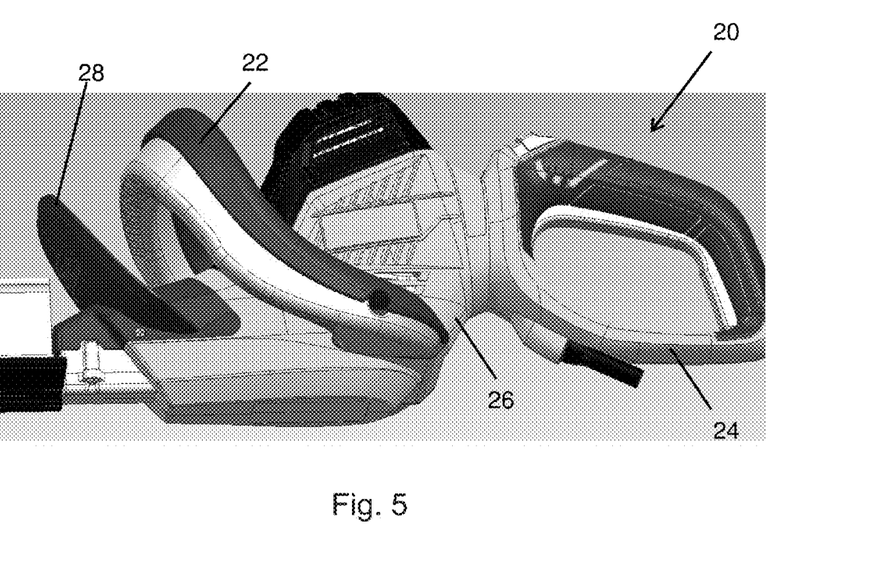
FIG. 5 shows a reciprocating power tool in an alternative embodiment of the present invention.

Another embodiment of a reciprocating power tool 20, in the form of a hedge trimmer (trimmer blades not shown), is provided in FIG. 5. In this embodiment, the reciprocating power tool 20 includes a front handle 22, a rear handle 24, a main housing 26, a safety guard 28 and a pair of reciprocating blades (not clearly shown). An actuator for actuating the motor and hence the blades for trimming is provided on the handle or the housing that can be readily accessed by the user. Functions of above elements of the power tool are similar to those known in the art and thus will not be exhaustively described.

Figure 6:
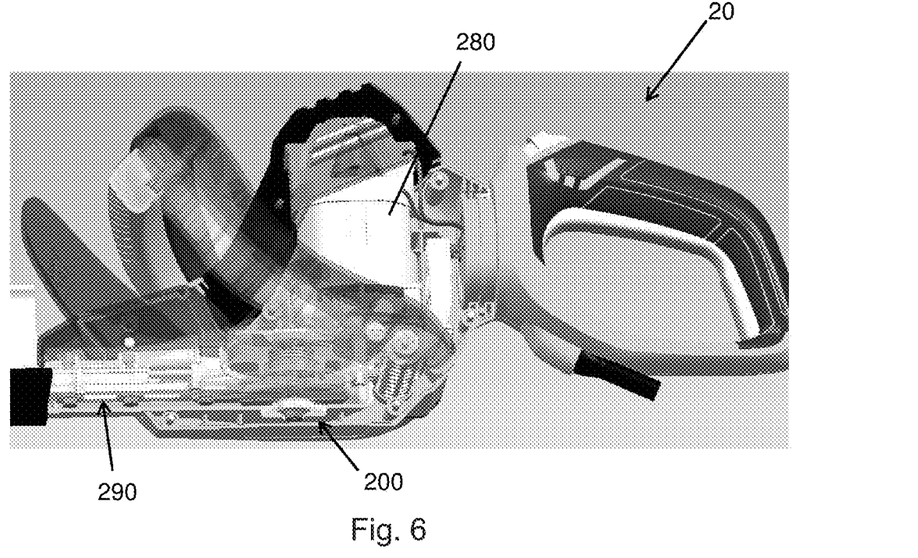
FIG. 6 shows some of the internal components of the reciprocating power tool of FIG. 5.

As shown in FIG. 6, a motor 280, a driving mechanism 200 in the form of a gear assembly, and a blade assembly 290 with a pair of reciprocating blades are disposed in the housing 26. The motor 280, the driving mechanism 200 and the blade assembly 290 cooperate with each other to effect the reciprocating operation of the power tool 20.

Figure 7:
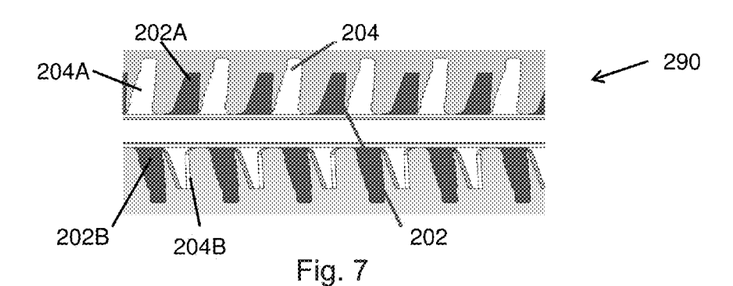
FIG. 7 shows the reciprocating blades of the reciprocating power tool of FIG. 5.

FIG. 7 shows a pair of blades 202, 204 that may be driven into reciprocation by the motor 280 and the driving assembly 200. Each blade 202, 204 in the blade pair includes a plurality of blade teeth 202A, 202B, 204A, 204B disposed on both sides of the blade body. Specifically, the blade teeth 202B, 204A on one side of the blade body are longer and less sharp compared with the blade teeth 202A, 204B disposed on the opposite side of the blade body. Each of the blade teeth 202A, 202B, 204A, 204B on both sides extends at an angle from but not perpendicular to the longitudinal blade body. The blades 202, 204 in the blade pair is arranged one on top the other, similar to that in the first embodiment, such that the longer blade teeth 202B, 204A in one blade and the shorter blade teeth 202A, 204B in the other blade are disposed on the same side of the blade assembly 290, in an interleaving manner. It should be noted that the blades in the blade assembly could take other structure depending on operations, without deviating from the spirit of the invention.

Figure 8:
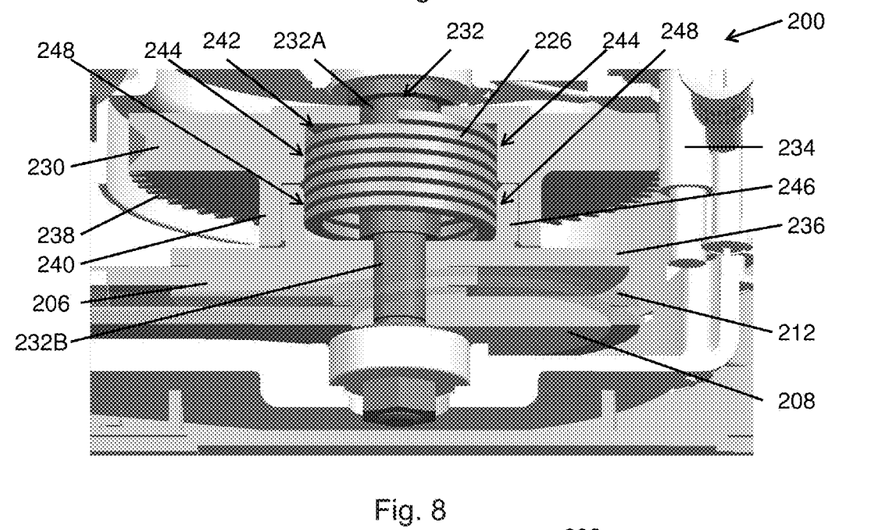
FIG. 8 shows a driving mechanism of the reciprocating power tool of FIG. 5.

FIG. 8 shows the driving mechanism 200 of the reciprocating power tool 20. The driving mechanism 200 in the illustrated embodiment is in the form of a gear assembly, with a pinion gear 234, a gear member 230, a resilient element 226, a resilient element cover 236, an output shaft 232, cams 206, 208, and connection rods 210, 212 (only connection rod 212 is shown in FIG. 8). These elements will be described in further detail below.

The pinion gear 234 with gear teeth (not shown) forming on its external surface is directly coupled with an output shaft of the motor 280 such that the rotation of the motor will drive the pinion gear 234 into rotation. A gear member 230 in the form of a circular disc with a plurality of external gear teeth 238, a center through-hole and a circular downward protruding rib 240 defining circular chamber 242 that opens at the bottom. As shown in FIG. 8, the circular chamber 242 has an upper portion that has a circular wall with a smaller diameter and a lower portion that has a circular wall with a larger diameter. The gear teeth 238 of the gear member are arranged for engagement with the gear teeth (not shown) of the pinion gear 234.

The resilient element 226, a torsion spring in the illustrated embodiment, is disposed within the open chamber 242 formed by the gear member 230, and spans across substantially through both the upper and lower portions of the chamber. The upper half external surface of the torsion spring 226 abuts the inner surface of the upper portion of the chamber 242 (the stepped portion which has a smaller diameter) such that a friction surface 244 is formed along the contacts between the torsion spring 226 and the inner wall of the upper portion of the gear member chamber 242.

A resilient element cover 236 is provided at the bottom of the gear member 230 for enclosing the chamber 242 of the gear member 230. The torsion spring cover 236 includes a circular plate with an opening and an upward protruding circular wall 246, concentric with the lower portion of the gear member 230 but with a smaller diameter, such that the outer wall of the upward protruding circular wall 246 of the resilient element cover 236 is directly facing to the inner wall of the lower chamber portion of the gear member 230. The inner wall of the upward protruding circular wall of the torsion spring cover 236 abuts the external surface of the torsion spring 226 to form another friction surface 248.

Figure 9:
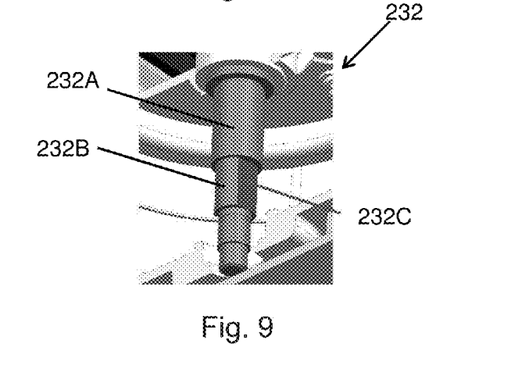
FIG. 9 shows the construction of the output shaft in the driving mechanism in FIG. 8.

The gear member 230, the resilient element 226 and the resilient element cover 236 are substantially concentric and in alignment with each other in the present invention. The output shaft 232 includes an upper section 232A that extends through the opening in the gear member 230 and passes the interior of the torsion spring 226; and a lower portion 232B that extends through the opening of the torsion spring cover 236 and that of the cams 206, 208 such that the outer surface of the lower portion 232B of the output shaft 232 is directly engaged with resilient element cover 236 and the cams 206, 208. As shown in FIGS. 8 and 9, the upper portion 232A of the output shaft has a larger diameter compared to the lower portion 232B of the output shaft, and a flat surface 232C is formed on the lower portion 232B of the output shaft 232 for enhancing engagement with the resilient element cover 236 and cams 206, 208.

A cam 206, 208 is arranged in an opening of each connection rod 210, 212 (only one connection rod is shown in FIG. 8), and each of the connection rods 210, 212 are in turn connected to one of the blades 202, 204 of the blade assembly 290 (see FIG. 6, as FIG. 8 does not show clearly the upper set of cam and connection rod). The cams 206, 208 in this embodiment are eccentric cams each having a substantially circular plate-like structure and an eccentric through-hole. The through-hole of the cams 206, 208 receives the output shaft 232 and engages snugly with an outer surface, in particular the flat surface 232C, of the lower portion 232B of the output shaft 232. The through-holes on the two cams are substantially out of alignment with each other such that one of the connection rods 210, 212 and hence the blades 202, 204 is forward to the other. In this way, the blades 202, 204 can reciprocate out of phase with respect to each other for effective cutting or trimming.

Figure 10:
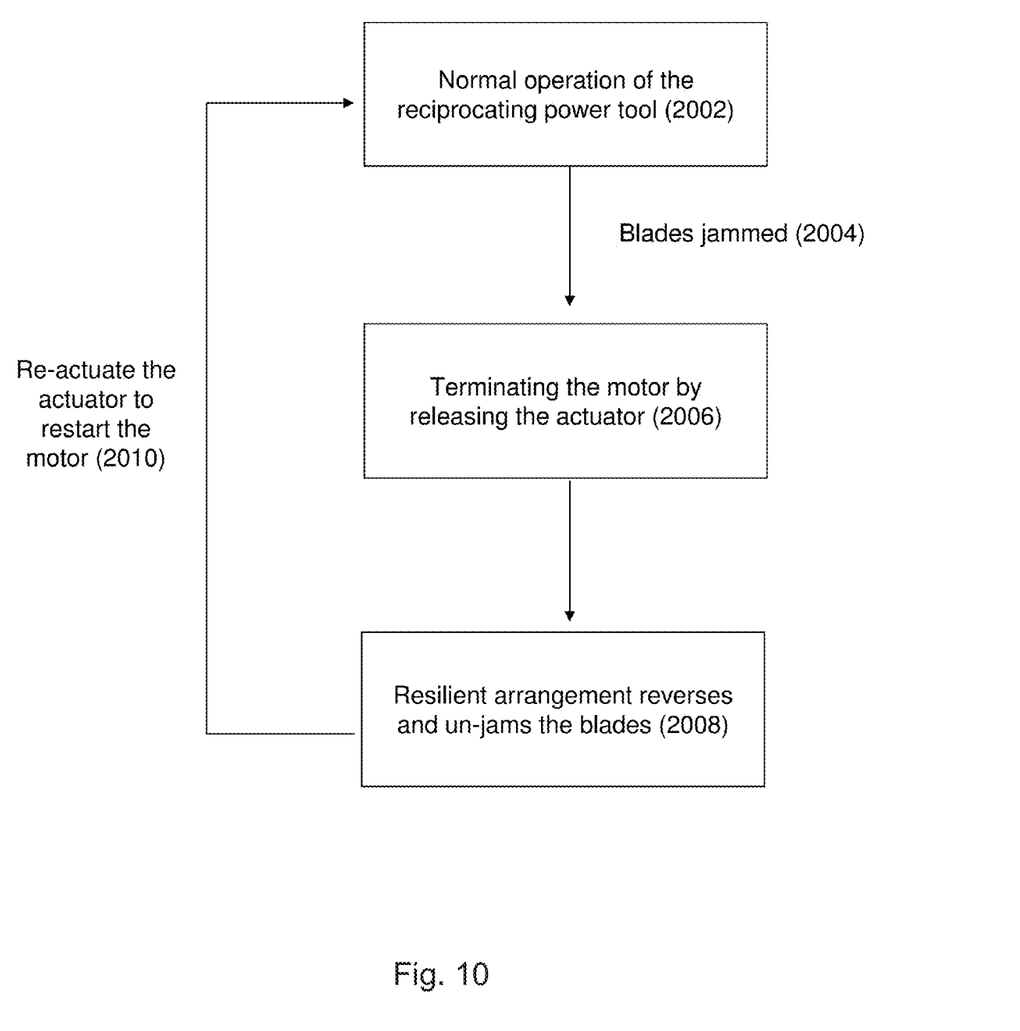
FIG. 10 shows a flow chart illustrating the operation of the reciprocating power tool in FIG. 5.

During operation of the power tool of FIG. 5, in step 2002, the user first actuates the actuator (e.g. a button, knob, trigger, etc) on the body or handle of the tool 20 to actuate the motor 280. The rotation of the motor 280 drives the motor shaft and hence the pinion gear 234 into rotation. The rotation of the pinion gear 234 is then transmitted to the gear member 230 through the engaged gear teeth 238 on the outer surface of the pinion gear 234 and the gear member 230. The rotation of the pinion gear 234 has an opposite sense to that of the gear member 230. Next, the rotation of the gear member 230 drives the resilient element 226, i.e. the torsion spring, into rotation through the friction surface 244 formed between the inner wall of the upper portion of the chamber 242 of the gear member 230 and the outer surface of the torsion spring 226. The rotation of the torsion spring 226 in turn drives the torsion spring cover 236 into rotation through the friction surface 248 formed between the inner wall of the torsion spring cover 236 and the outer surface of the torsion spring 226. In this way, the torsion spring 226 is charged/compressed/loaded by the motor 290 as it rotates or as the motor 280 operates.

As the opening of the torsion spring cover 236 receives the output shaft 232 and snugly engages with the outer surface, in particular the flat surface 232C, of the lower portion 232B of the output shaft 232, the output shaft 232 is driven into rotation by the movement of the torsion spring cover 236. Once the output shaft 232 is driven into rotation by the torsion spring cover 236, the output shaft 232 will drive the eccentric cams 206, 208 into rotation through the flat surface 232C on the outer surface of the lower portion of the output shaft 232. The rotation of the eccentric cams 206, 208 in turn causes the connection rods 210, 212 and hence the blades 202, 204 to rotate in a reciprocating manner.

In case when the blades are jammed in step 2004, for example by accidentally encountering a hedge that is beyond the cutting capacity of the blade assembly 290, the cams 206, 208 would not be able to rotate. The user, upon sensing or observing the jamming of the blades 202, 204, will have to release the actuator that actuates the motor in step 2006 such that the motor 280 operation is terminated and the pinion gear 234 ceases rotation. Once the motor 280 terminates, the charging force on the torsion spring 226 is removed and the torsion spring 226 reverses/discharges/recoils back to its normal unbiased position and ultimately un-jams the jammer blades in step 2008. In particular, the torsion spring 226 discharges and drives the torsion spring cover 236 to reverse through the friction surface 248 between the spring 226 and the spring cover 236. The torsion spring cover 236 then reverses the motion of the output shaft 232 through its engagement with the flat surface 232C on the lower portion 232B of the output shaft 232. The output shaft 232 drives the cams 206, 208 to reverse, again through the engagement between the flat surface 232C on the lower portion 232B of the output shaft 232 and the cams 206, 208. Finally, the cams 206, 208 drive the connection rods 210, 212 and hence the blades 202, 204 into reversal, opposite to the original operating direction, and un-jam the blades. Once this is performed, the user will have to re-actuate the actuator to start the motor 280 and hence resume the trimmer or cutting operation in step 2010.

The invention provides a reciprocating power tool which is effective and efficient in operational use. The exemplary reciprocating power tool shown in the above embodiments is a hedge trimmer. However, it should be readily appreciated that other types of power tool with cutting mechanisms capable of reciprocal motion may also be used.

The reciprocating power tool of the invention includes a simple yet robust anti-jamming mechanism for un-jamming the blades. By having to reactivate the actuator and hence the motor in order to resume normal operation of the power tool after the blades got stuck, an additional degree of safety protection is provided. Further advantages of the present invention in terms of operation, cost and effectiveness, will become apparent to a person skilled in the art, by referring to the above description.

Lastly, aspects of the present invention have been described by way of example only and it should be appreciated that modifications and additions may be made thereto without departing from the scope thereof.

Various features and advantages of the invention are set forth in the following claims.

What is claimed is:

1. A reciprocating power tool comprising:
   a reciprocating cutting mechanism including a pair of blades with interleaving blade teeth, the reciprocating cutting mechanism arranged to be driven by a motor via a driving assembly, wherein the driving assembly includes a resilient arrangement arranged to be charged when the cutting mechanism is driven by the motor and, whereupon the drive from the motor is terminated, the resilient arrangement is arranged to reverse the cutting mechanism from a direction of the drive from the motor; wherein the resilient arrangement includes a torsion spring arranged to be charged by friction between the torsion spring and the driving assembly when the cutting mechanism is driven by the motor and discharged when the drive from the motor is terminated to reverse the cutting mechanism; and
   wherein the driving assembly further comprises:
      a gear member with a first through-hole and a recess, the recess defining a first part of a chamber with an upper inner wall for contacting at least part of the torsion spring;
      a cover member with a second through-hole and a protruding rib, the protruding rib defining a recess that forms a second part of the chamber with a lower inner wall for contacting a remaining part of the torsion spring;
      two eccentric cams each having an opening and are each connected with one of the blades; and
      an output shaft arranged to connect and extend through the first through-hole of the gear member, the torsion spring, the second through-hole of the cover member, and the openings of the eccentric cams for transmitting rotations between components of the driving assembly.

2. A reciprocating power tool comprising:
   a reciprocating cutting mechanism arranged to be driven by a motor via a driving assembly, wherein the driving assembly includes a resilient arrangement arranged to be charged when the cutting mechanism is driven by the motor and, whereupon the drive from the motor is terminated, the resilient arrangement is arranged to reverse the cutting mechanism from a direction of the drive from the motor.

3. The reciprocating power tool of claim 2, wherein the drive from the motor is automatically terminated when a jam of the reciprocating cutting mechanism is registered.

4. The reciprocating power tool of claim 2, wherein the resilient arrangement includes a torsion spring arranged to be charged when the cutting mechanism is driven by the motor and discharged when the drive from the motor is terminated to reverse a direction of reciprocation of the cutting mechanism.

5. The reciprocating power tool of claim 4, wherein the torsion spring is charged by friction between the torsion spring and the driving assembly.

6. The reciprocating power tool of claim 4, wherein the cutting mechanism includes a pair of blades, and wherein the driving assembly further comprises:
   a gear member with a first through-hole and a recess, the recess defining a first part of a chamber with an upper inner wall for contacting at least part of the torsion spring;
   a cover member with a second through-hole and a protruding rib, the protruding rib defining a recess that forms a second part of the chamber with a lower inner wall for contacting a remaining part of the torsion spring;
   two eccentric cams each having an opening and are each connected with one of the blades; and
   an output shaft arranged to connect and extend through the first through-hole of the gear member, the torsion spring, the second through-hole of the cover member, and the openings of the eccentric cams for transmitting rotations between components of the driving assembly.

7. The reciprocating power tool of claim 6, wherein the output shaft is snugly connected with the second through-hole of the cover member, and the openings of the eccentric cams.

8. The reciprocating power tool of claim 7, wherein the output shaft includes at least one flat surface portion and one curved surface portion for snugly connecting with the second through-hole of the cover member, and the openings of the eccentric cams.

9. The reciprocating power tool of claim 7, wherein:
   a first friction surface is formed between the upper inner wall of the chamber and an outer surface of at least part of the torsion spring; and
   a second friction surface is formed between the lower inner wall of the chamber and an outer surface of the remaining part of the torsion spring.

10. The reciprocating power tool of claim 9, whereupon the motor is actuated,
    the gear member is driven into rotation to drive and charge the torsion spring through the first friction surface;
    the torsion spring is charged and driven into rotation to drive the cover member through the second friction surface;
    the cover member is driven into rotation to drive the output shaft; and
    the output shaft is driven into rotation to drive the cams such that the blades are driven into reciprocation.

11. The reciprocating power tool of claim 9, whereupon the drive from the motor is terminated, the charged torsion spring is arranged to discharge and reverse the rotation of the cover member, the output shaft, and the eccentric cams, so as to reverse the blades from the direction of the drive from the motor.

12. The reciprocating power tool of claim 6, wherein the gear member, the cover member, the torsion spring, and the output shaft are arranged in a coaxial manner.

13. The reciprocating power tool of claim 2, further comprising an actuator for controlling an operation of the motor; wherein the actuator is arranged to be actuated by a user to operate the motor; and whereupon the reciprocating cutting mechanism is jammed, the actuator is manually releasable by the user to terminate the drive from the motor.

14. The reciprocating power tool of claim 2, wherein the reciprocating cutting mechanism includes a pair of blades with interleaving blade teeth.

15. The reciprocating power tool of claim 14, wherein the pair of blades are arranged to reciprocate out of phase during operation.

16. The reciprocating power tool of claim 2, wherein the reciprocating power tool is a hedge trimmer.

17. The reciprocating power tool of claim 2, wherein the resilient arrangement is arranged to discharge in response to termination of the drive from the motor, wherein discharging of the resilient arrangement reverses a direction of reciprocation of the cutting mechanism.

18. The reciprocating power tool of claim 2, wherein a driving force of the motor inhibits the resilient arrangement from discharging.

19. The reciprocating power tool of claim 18, wherein the resilient arrangement discharges when the driving force of the motor is removed.

20. The reciprocating power tool of claim 2, further comprising a detection circuit arranged to detect jamming of the cutting mechanism, wherein the motor is automatically terminated when jamming of the cutting mechanism is detected, wherein the resilient arrangement is configured to discharge in response to motor termination.

21. A reciprocating power tool comprising:
a reciprocating cutting mechanism arranged to be driven by a motor via a driving assembly, wherein the driving assembly includes a torsion spring arranged to be charged when the cutting mechanism is driven by the motor and, whereupon the drive from the motor is terminated, the torsion spring is arranged to reverse the cutting mechanism from a direction of the drive from the motor.

\* \* \* \* \*